United States Patent [19]

Thore

[11] Patent Number: 4,895,294
[45] Date of Patent: Jan. 23, 1990

[54] METHOD AND APPARATUS FOR CONTROLLING SOLDER FLOW IN METALLIC MEMBERS

[76] Inventor: George M. Thore, 5312 New Church Ct., Fairfax, Va. 22032

[21] Appl. No.: 317,554

[22] Filed: Mar. 1, 1989

[51] Int. Cl.$^4$ .............................................. B23K 31/02
[52] U.S. Cl. ...................................... 228/222; 228/46
[58] Field of Search ........................... 228/222, 199, 46

[56] References Cited

U.S. PATENT DOCUMENTS

| | | | |
|---|---|---|---|
| 3,110,103 | 11/1963 | Davey | 228/46 |
| 3,110,277 | 11/1963 | Dixon et al. | 228/46 |
| 4,103,138 | 7/1978 | Moriki | 228/222 |
| 4,274,576 | 6/1981 | Shariff | 228/46 |
| 4,319,707 | 3/1982 | Knemeyer | 228/222 |

FOREIGN PATENT DOCUMENTS 57-56191  4/1982  Japan .................................. 228/222

Primary Examiner—M. Jordan
Attorney, Agent, or Firm—Hoffman, Wasson, Fallow & Gitler

[57] ABSTRACT

A method and apparatus for controlling the flow of solder and heat in metallic members. The apparatus includes a housing for receiving a portion of the metallic member in which the flow of solder and heat is to be controlled. A second portion of the metallic member in which the flow of heat and solder is desired is allowed to project from the housing. An inlet for a cooling medium is provided in the housing. According to the method of the invention, a cooling medium is directed into the housing, whereby molten solder and/or heat which is applied to the unenclosed portion of the metallic member is allowed to flow across the unenclosed portion but is terminated substantially at the point where the metallic member is enclosed by the housing.

21 Claims, 2 Drawing Sheets

METHOD AND APPARATUS FOR CONTROLLING SOLDER FLOW IN METALLIC MEMBERS

BACKGROUND OF THE INVENTION

1. Field of the Invention

The invention pertains broadly to a method and apparatus for controlling the temperature of, and the flow of heat in, a metallic member such as copper piping. More particularly, the invention relates to a method and apparatus whereby the flow of solder between metallic members may be selectively limited and controlled.

Although it is susceptible to a variety of applications wherein it is necessary to control the temperature of or the heat flow in a heat conductive metallic member, the invention finds particular utility in soldering copper pipe ends together. Conventional soldering processes generally involve inserting the end of a pipe of a given diameter into the open end of a second pipe of a slightly larger diameter. The larger pipe is typically a fitting, which possesses a configuration enabling it to receive two or more pipe ends so as to orient the received pipe members at 180°, 90°, 45°, etc. to each other. Once the pipe ends have been inserted in the fitting, a flux material is applied to the fitting. The overlapping portion of the pipe end and fitting is then heated, typically by means of an oxygen acetylene torch, and a soldering material, usually a silver composition, is applied to the outside end of the overlapping portion at the end of the fitting. The melting points for typical silver soldering compounds require that the overlapping portion of the pipe end and fitting be heated to around 1250° F. or more. This high heat, together with capillary action, results in the melted soldering compound being drawn axially between the overlapping pipe ends from the outside end of the overlapping portion to the opposite end of the overlapping portion within the fitting, being referred to as 100% flow. Indeed, the solder composition and/or the flux material often flows beyond the opposite end of the overlapping portion and protrudes into the interior of the fitting.

While 100% solder flow is acceptable in many cases, certain applications call for limiting the solder flow. For example, when the pipe members are designed to convey a high purity gas which might be contaminated by the exposed solder and/or flux materials, it is imperative that the flow of solder across the overlapping portion be confined to between 25% and 75% and, preferably, to 50% flow. Because the capillary force governing the flow of the solder between the overlapping pipe members is extremely strong, such force is difficult to impede. As such, selective termination of the solder flow has been heretofore difficult, if not impossible, to obtain on a reliable basis.

Prior art measures directed to solving the present problem have generally relied upon physical deformation of the pipe members so as to create a mechanical barrier or dam for terminating the solder flow. The latter methods are characterized by their complexity, adding additional extraneous steps to the otherwise simple soldering process, and by their failure to realize desirable standards of reliability and quality. In fact, such methods typically rely for their success upon the skill and expertise of a particular technician, acquired through countless hours of practice, and thus are prone to inconsistent results.

The subject invention addresses and overcomes the preceding problem by providing a method and apparatus for controlling solder flow which does not involve physical alteration of the pipe members, which is simple to execute and utilize, and which consistently achieves the highest degree of reliability and integrity. The present invention provides an apparatus for receiving a metallic member and being adapted to control the temperature of a selective portion of the metallic member for preventing the flow of solder and heat into the temperature controlled portion.

A further deficiency frequently associated with prior art soldering processes is that the extreme heat to which the copper piping is subjected causes it to become annealed and to lose some of its original strength. Metal which is heated expands and, when cooled, subsequently contracts. If the cooling is not uniform across the heated area, the member may become warped. This problem is intensified in a soldering process because the pipe members are only locally heated. As a result, undesirable dimensional changes in the members are common and the strength of the pipe members is compromised.

Moreover, copper alloy pipe members contain a small amount of cuprous oxide. In fusion welding and soldering processes, there is a redistribution of the cuprous oxide in the copper adjacent the soldered area or weld, at the point where the copper pipe closely approached the fusion temperature to which the member was heated. Consequently, there is a weakened zone adjacent the soldered joint, whereby the strength of the joint may be only 70% the strength of the copper base metal. Moreover, further weakening occurs when the heating flame carries hydrogen, as is the case with an oxygen acetylene torch. The hot hydrogen penetrates into the metal piping a few thousands of an inch back of the soldering line. The latter penetration reduces the cuprous oxide to form water vapor and disrupts the composition of the metal, producing a weakened zone adjacent the solder line which has only around 50% of the strength of the base metal.

The present invention effectively eliminates the creation of the aforementioned detrimental weakened areas in soldered copper piping. Relying as it does upon a thermal barrier for controlling the flow of heat through metal, the invention is able to successfully obtain an abrupt change in temperature directly adjacent a heated portion of copper tubing. When utilized in a process for soldering or welding pipe ends, the invention creates a temperature gradient at the pipe ends adjacent the heated overlapping portion, whereby solder is prevented from flowing beyond the thermal barrier and whereby the temperature of the area of the pipe ends immediately adjacent the solder line is controlled, so as to protect the base metal from the detrimental effects of heat. The invention realizes these and all of the foregoing objectives by presenting an apparatus for receiving a copper pipe fitting which has the end of a smaller diameter copper pipe inserted in at least one of its ends. The tool encloses a selective portion of the copper pipe fitting and has its side edges terminating at a point along the overlapping portion of the pipe end and the fitting which corresponds to the location beyond which it is desired to prevent the flow of solder. A coolant is directed into the interior of the tool, whereby the temperature of and the flow of heat in the overlapping portion of the pipe end and fitting is controlled. As a result, solder is prevented from flowing in the overlapped portion beyond the side edges of the tool.

2. Description of the Prior Art

It is known in the prior art to attempt to control the flow of solder in a pipe joint by deforming the pipe members to create a mechanical barrier to solder flow.

For example, U.S. Pat. No. 4,396,213, which issued on Aug. 2, 1983 to Hawkins teaches a method and joint wherein the flow of solder is limited in overlapped pipe ends by means of a circumferential groove formed in the exterior of the fitting creating an interior protrusion which tightly engages a groove formed on the exterior of the end of the inner pipe. No more than an insignificant amount of solder is allowed to flow beyond the interlocking grooves.

Similarly, Barnhart, et al. which issued on Apr. 18, 1950, teaches interengaging constrictions provided on outer and inner tubes, and which allow only a small amount of solder to flow into the space where the inner tube is gripped by the outer tube.

It is also known in the prior art to terminate the flow of solder between interfitting pipe ends by means of a seal created by abutting engagement between the pipe ends. U.S. Pat. No. 1,890,998 to Lindquist, for instance, dated Dec. 13, 1932, is directed to a joint wherein the inner pipe end is formed with a taper that tightly abuts against an interior shoulder formed in the outer pipe to seal off the interior of the outer pipe from the flow of solder. A variation of the latter joint is disclosed by U.S. Pat. No. 2,084,207, which issued to Lindquist, et al. on June 15, 1937. As shown therein, a tight joint is created between the inner pipe end and the interior of the outer pipe end by means of mating thread formations which prevent the entry of solder.

The prior art also teaches and makes known the concept of controlling the flow of a brazing filler alloy by means of a barrier consisting of an incompatible substance. Hikido, et al., U.S. Pat. No. 3,750,266 of Aug. 7, 1973, teaches the use of a flow control substance, such as a metal, applied to a surface to be brazed for confining the brazing alloy to a desired area. A similar teaching is provided by U.S. Pat. No. 3,667,109 to Alcenius, which issued on June 6, 1972 and wherein a contaminant is employed to prevent a melted brazing alloy from adhering to a portion of a fitting.

Additionally, the prior art discloses a method for controlling the flow of brazing alloy in order to avoid the disadvantages caused by annealing. In this regard, U.S. Pat. No. 3,198,556, issued on Aug. 3, 1965, to Kruse, et al. discloses inspection ports provided in a fitting to permit visual observation of the flow of a brazing alloy at the ports, whereupon the application of heat may be halted and the brazing alloy allowed to cool.

It is also generally known in the prior art to provide means for cooling a soldered joint or weld. Such means commonly involve inserting a cooling member or coolant source within the interior of a conduit which is being welded on its exterior surface. U.S Pat. No. 4,387,845, which issued on June 14, 1983 to Mefferd, shows a hollow cylindrical barrel which is adapted to have a hose coupling welded on its outer surface. An expanding mandrel is slidably inserted into the interior of the barrel, is positioned in radial alignment with the area to be welded, and is expanded to contact the interior surface of the barrel. A coolant is circulated through the mandrel to transfer heat away from the welded area.

U.S. Pat. No. 4,218,604 to Masaoka, et al., dated Aug. 19, 1980, teaches a method and apparatus for butt welding wherein a pair of pipe ends are welded, an insert is introduced into the interior of the welded pipe, and cooling medium is caused to flow in the pipe. The insert increases the velocity of the cooling medium so that maximum velocity occurs in the vicinity of the weld.

Similarly, Sloan, et al., U.S. Pat. No. 4,101,067, dated July 18, 1978, is directed to an expandable heat sink and sealing bladders for sealing the adjacent interiors of the ends of two pipes to be welded. Coolant is fed into the interior of the bladders to expand same and to cool the welded joint.

Similarly, U.S. Pat. No. 4,223,197, which issued to Imai, et al. on Sept. 16, 1980, discloses a rotatable nozzle for injecting a cooling medium against the inner surface of a pipe, the outer surface of which is being welded.

The prior art also makes known methods and devices for applying a coolant directly to a weld zone. For instance, U.S. Pat. No. 3,773,260 of Nov. 20, 1973 to Kunioka, et al., discloses a nozzle for directing a mist jet of cooling water and compressed air to a weld.

U.S. Pat. No. 3,948,428 to Bonomo, et al., dated Apr. 6, 1976, also teaches the combined use of water and gas to directly cool a weld. As shown therein, a pair of sliding blocks are arranged to face the weld, and nozzles provided in the blocks direct cooling water and gas to the weld. The sliding blocks serve to contain the molten bath for the weld.

It is further known in the prior art to utilize liquid nitrogen for cooling purposes. An example of this teaching is provided by U.S. Pat. No. 4,296,300 to Bottiglia, which issued on Oct. 20, 1981 and wherein a cooling saddle supplied with liquid nitrogen is arranged on a plate to be welded opposite the welding torch. During the formation of the weld, gaseous nitrogen escapes through holes in the saddle to cool a temperature degradable protecting coat applied to the plate prior to welding.

A welding chill which utilizes inert nitrogen gas is disclosed in U.S. Pat. No. 4,170,473 to Gerken and dated Oct. 9, 1979. The chill comprises a gas pervious body adapted to be supplied with an inert gas and applied to a welded area.

Finally, the prior art discloses a cooling box for covering the butt welded portion of a rail. As shown in U.S. Pat. No. 4,573,666, which issued to Nomura, et al. on Mar. 4, 1986, the cooling box includes a U-shaped box adapted to surround the welded portion of a rail, and which is divided into a plurality of independent cooling chambers. Each of the chambers is provided with a plurality of nozzles for directing cooling air toward the welded portion.

The prior art fails to teach or suggest a method and apparatus for controlling solder and heat flow in metallic pipe members which is characterized by a device for enclosing the area of pipe to be controlled, which is provided with an interior cavity for receiving a cooling substance, and which effectively and precisely prevents the flow of solder into the enclosed portion of the pipe members.

SUMMARY OF THE INVENTION

The invention pertains to a solder and heat flow control apparatus comprising a two part housing which is adapted to be assembled around a portion of a conduit member in which the flow of solder and heat is to be controlled. The housing defines an interior cavity in which the conduit member is to be disposed, with at least one end of the conduit member projecting outside the housing through an opening provided in the housing. An inlet for a cooling medium is provided in the housing, communicating with the interior cavity. Additionally, one or more vent openings are provided in the housing, establishing communication between the interior of the housing and the atmosphere.

The apparatus is intended to be utilized by assembling the housing around a first conduit member, a portion of the conduit member being completely enclosed within the housing, with at least one end of the conduit member projecting from the housing and being unenclosed. An end of a second conduit member is intended to be inserted into the unenclosed end of the first conduit member, such that a portion of the first conduit member overlaps the inserted end and a part of the overlapping portion is enclosed by the housing. According to the method of the present invention, liquid nitrogen is directed into the interior cavity of the housing, at least the unenclosed end of the overlapping portion is heated, and solder is applied thereto. The solder flows axially across the overlapping portion, with the solder flow being terminated substantially at the point where said housing encloses said overlapping portion.

DESCRIPTION OF THE PREFERRED AND ALTERNATIVE EMBODIMENTS

Figure 1:
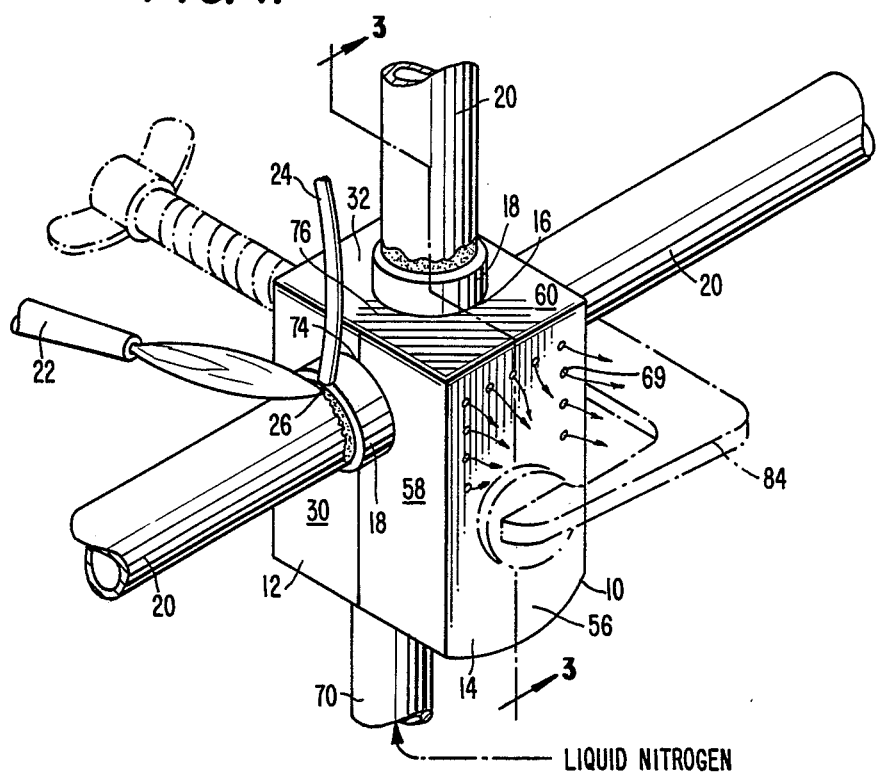
FIG. 1 is a perspective view of the solder and heat flow control apparatus as it appears when assembled upon a T-shaped pipe fitting during the soldering process.
Figure 2:
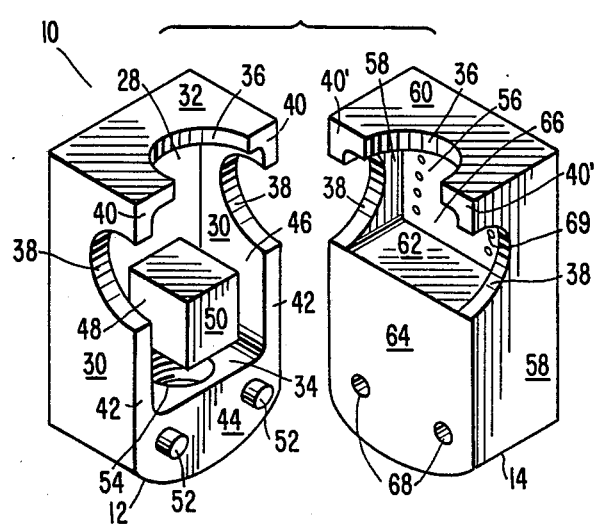
FIG. 2 is a perspective view of the solder and heat flow control apparatus as it appears when unassembled.

A preferred embodiment for the solder and heat flow control apparatus is illustrated in FIGS. 1–4. With particular reference to FIGS. 1 and 2, the solder and heat flow control apparatus, as indicated generally at 10, comprises a first housing member 12 and a second housing member 14. As shown in FIG. 1, the first and second housing members are adapted to be assembled together around a metallic member in which the flow of solder or heat is to be controlled. FIG. 1 shows the first and second housing members assembled on a copper pipe fitting 16 of T-shape configuration. The fitting 16 has three open ends 18, two of which ends are visible in FIG. 1. Each of the open ends 18 of the fitting is adapted to have inserted therein the end of a length of copper pipe 20 which has an outer diameter slightly smaller than the inner diameter of the fitting 16. When so positioned, the inserted ends of the respective pipes 20 are overlapped by a portion of the ends 18 of the fitting. The invention finds particular application in a process wherein the pipe ends are soldered or fusion welded to the respective ends 18 of the fitting to establish a high-strength connection between the pipes 20 and the fitting 16.

The typical soldering process, as depicted in FIG. 1, involves applying a flux material to the fitting, locally heating the overlapping portion of the pipe end and fitting to about 1250° F. by means of an oxygen acetylene torch 22, and simultaneously applying a silver solder composition 24 to the exposed end 26 of the overlapping portion. Under normal conditions, capillary action causes the melted solder to flow axially along the overlapping portion, in the small clearance space between the pipe end and the fitting, from the exposed end 26 all the way to the opposite end of the overlapping portion inside the fitting. Frequently, the solder composition, and/or the flux material, flows beyond the overlapping portion inside the fitting and onto the interior surface of the fitting. The solder and heat flow control apparatus 10 is uniquely adapted to prevent solder flow beyond the overlapping portion onto the interior surface of the fitting and, indeed, allows the flow of solder to be terminated at any desired point along the overlapping portion.

As previously mentioned, the solder and heat flow control apparatus 10 comprises first housing member 12 and second housing member 14. As best illustrated in FIG. 2, the first housing member 12 is defined by a back wall 28, a pair of side walls 30, upper wall 32 and lower wall 34. The upper wall 32 is provided with arcuate opening 36, while each of the side walls 30 is provided with a similar opening 38. Each of the openings 36 and 38 are configured so as to correspond to one-half the circumference of the end 18 of the fitting 16 upon which the appartus is to be assembled. Additionally, the openings 36 and 38 are located in the upper and side walls so as to correspond to the position of the ends 18 on the fitting 16. It is, of course, apparent that the recesses or openings 36 and 38 need not be arcuate in shape, but rather, may be shaped to conform to fittings of various cross-sectional configurations and are not limited to the circular cross-sectional fittings depicted by way of example herein.

With further reference to FIG. 2, it can be seen that the upper, side and lower walls of first housing member 12 terminate in planar front corner surfaces 40, front side surfaces 42, and a front lower surface 44, which circumscribe a front opening 46 into the interior of the first housing member. A support member 48 extends from the back wall 28 into the interior of the housing and has a planar front support surface 50 which is coplanar with the front surfaces 40, 42 and 44.

A pair of raised alignment members 52 are provided on the front lower surface 44. Additionally, coolant inlet opening 54 is formed in the lower wall 34 to provide communication between the exterior and the interior of the housing.

The second housing member 14 is also best depicted in FIG. 2, wherein it can be seen that the second housing member 14 is defined by a back wall 56, a pair of side walls 58, upper wall 60 and lower wall 62. The upper and side walls of the second housing member are provided with recesses or openings 36 and 38 having the characteristics which were previously discussed in connection with the openings 36 and 38 of the first housing member.

The upper, side and lower walls of the second housing member terminate in planar front corner surfaces 40' and a front lower surface 64, between which front surface lies a front opening 66 into the interior of the second housing member. A pair of apertures 68 are provided in the front lower surface 64, corresponding in location to the location of the alignment members 52 on the first housing member. A plurality of vent openings 69 are formed in the back wall 56, establishing communication between the interior and the exterior of the second housing member.

Figure 3:
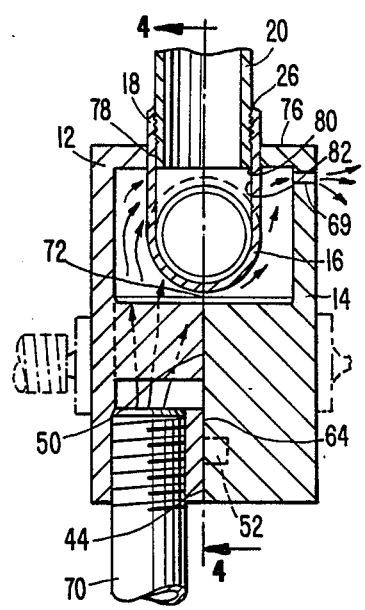
FIG. 3 is a side cross-sectional view of the solder and heat flow control apparatus taken along line 3—3 of FIG. 1.
Figure 4:
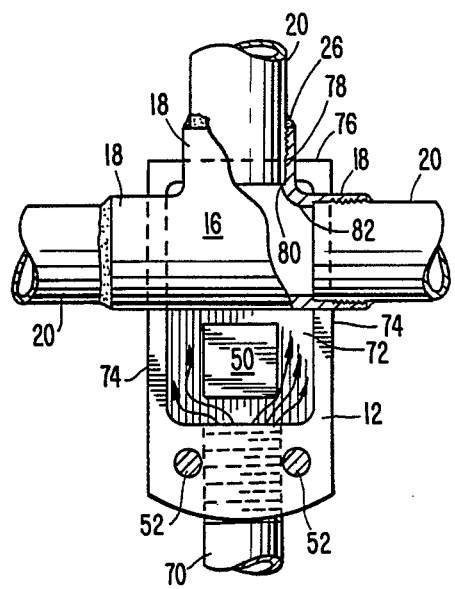
FIG. 4 is a front cross-sectional view of the solder and heat flow control apparatus taken along line 4—4 of FIG. 3.

FIGS. 1, 3 and 4, show the first and second housing members as they appear when assembled on the aforementioned T-shaped fitting 16 during a soldering process. Thus, the method of the present invention is practiced by placing the fitting 16 within the first housing member 12, such that the ends 18 of the fitting are disposed within the arcuate openings 36 and 38 formed in the first housing member. A supply conduit 70 associated with a source of liquid nitrogen is attached to the inlet opening 54 in the first housing member either prior or subsequent to insertion of the fitting. Once the liquid nitrogen connection has been established, and the fitting has been properly oriented and placed in the first housing member, the second housing member 14 is then brought into engagement with the first housing member around the fitting such that each of the alignment members 52 on the first housing member is received within a respective one of the apertures 68 provided on the second housing member. An end of copper pipe 20 to be secured to the fitting is then inserted into the fitting end 18 to which it is to be soldered or fusion welded.

The cross-sectional views of FIGS. 3 and 4 illustrate the interrelationship between the first and second housing members when they are assembled together upon the fitting 16. The assembled condition for the first and second housing members is characterized by the front corner surfaces 40 of the first housing member continuously abutting the corresponding front surfaces 40' of the second housing member. Moreover, the side surfaces 42 and the lower front surface 44 of the first housing member abuts the lower front surface 64 of the second housing member. Additionally, the front support surface 50 of the support member 48 of the first housing member continuously abuts the lower front surface 64 of the second housing member.

The assembled condition for the first and second housing members is further characterized by the interiors of the respective housing members together defining an interior cavity 72, which extends from the lower wall 34 of the first housing member, around the support member 48 and up to the upper walls 32 and 60 of the housing members. As shown in FIGS. 3 and 4, a portion of the fitting 16 is received within the cavity 72 such that a portion of the fitting is completely enclosed by the assembled housing members. More specifically, the body and ends of the fitting are enclosed up to the outer side edges 74 and outer top edges 76 of the assembled housing members.

FIGS. 3 and 4, which show the pipe ends 20 inserted into fitting ends 18, also depict the overlapping portion 78 between the pipe ends and the ends 18 of the fitting. When solder is applied to the exposed end 26 of the overlapping portion, capillary action normally causes it to flow axially all the way to the opposite end 80 of the overlapping portion within the fitting and, indeed, even beyond, so that the solder contaminates the interior walls 82 of the fitting.

According to the present invention, the solder flow is abruptly and precisely terminated at any desired point along the overlapping portion 78, the point of termination for the solder flow corresponding to the point at which the outer edges 74, 76 of the housing members contact the fitting. Thus, for example, as shown in FIG. 4, the flow of solder 24 is terminated at the outer side edge 74 and the outer top edge 76. It should be obvious, therefore, that the point at which solder flow is to be terminated may be selectively varied by varying the external dimensions of the first and second housing members and/or the overlap between the fitting and the pipe ends.

Once the housing members have been assembled on the fitting, as previously described, the remaining steps for the method of the present invention are carried out by clamping together the first and second housing members by any suitable means, such as the clamp 84 depicted in phantom in FIG. 1, by applying a flux material to the fitting, and by introducing the coolant medium into the cavity 72 defined by the housing members. Although the preferred form of coolant is liquid nitrogen, which typically has a temperature below 320.4° F. in the liquid state, it is to be understood that any other suitable coolant may be utilized.

The fitting 16 is locally heated to around 1250° F. at the overlapping portion 78, typically by means of an oxygen acetylene torch 22. A soldering material, usually a silver solder composition 24 is heated simultaneously so that it is applied in melted form to the exposed end 26 of the overlapping portion. During the soldering process, the liquid nitrogen vaporizes, the pressure within the cavity 72 being controlled by allowing the nitrogen gas to exit the housing member 14 via the vent openings 69.

The liquid nitrogen supplied to the cavity 72 serves to control the temperature of the housing members, which are preferably fabricated from a conductive metal such as steel, adjacent the enclosed fitting. The temperature of the housing members may be controlled to any desired degree, merely by regulating the supply of liquid nitrogen to the housing members. Naturally, thermistors or any suitable temperature indicating means may be utilized to continuously monitor the temperature of the housing members for control purposes.

Because the temperature controlled housing members circulate coolant adjacent the fitting, and act themselves as a thermal barrier and heat sink by establishing a temperature gradient in the overlapping portion 78, the flow of solder across the portion 78 may be reliably, effectively and selectively controlled.

Figure 5:
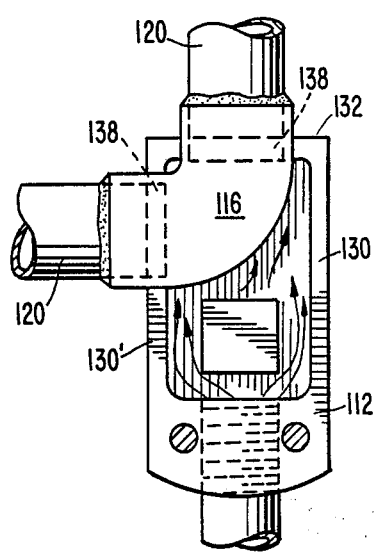
FIG. 5 is a front cross-sectional view of a first alternative embodiment for the solder and heat flow control apparatus adapted to accommodate a 90° fitting.

A first alternative embodiment for the apparatus of the present invention is illustrated in FIG. 5, wherein it can be seen that the first housing member 112 has been modified to accept a 90° fitting 116. One of the side walls 130 of the housing member is not provided with an opening 138 for a fitting, but rather, presents an uninterrupted surface for abutting the corresponding surface of a similarly modified second housing member. The other side wall 130' is provided with an opening 138, as is the upper wall 132, so as to receive a generally L-shaped fitting 116, whereby two pipes 120 are oriented at 90° to each other.

Figure 6:
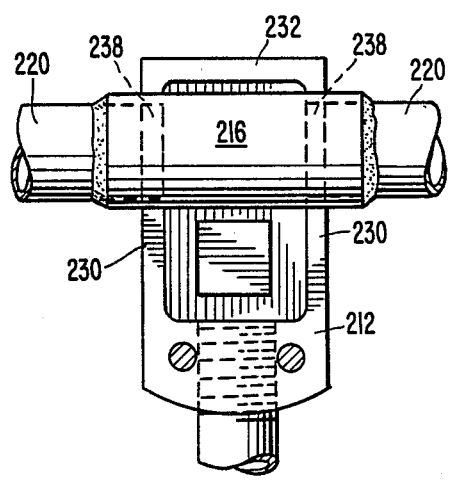
FIG. 6 is a front cross-sectional view of a second alternative embodiment for the solder and heat flow control apparatus adapted to accommodate a 180° fitting.

A second alternative embodiment for the solder and heat flow control apparatus is depicted in FIG. 6. The first housing member 212 shown in FIG. 6 is provided with openings 238 on each of its side walls 230, but not on its upper wall 232. The housing member 212 thus is adapted to accommodate a straight fitting 216, which orients the pipes 220 at 180°, and is intended to be associated with a second housing member that has been similarly altered.

Figure 7:
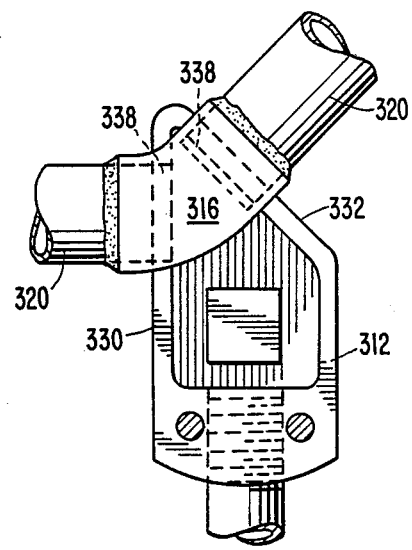
FIG. 7 is a front cross-sectional view of a third alternative embodiment for the solder and heat flow control apparatus adapted to accommodate a 135° fitting.

Finally, a third alternative embodiment for the first housing member 312 is illustrated in FIG. 7. The first housing member 312 accommodates a fitting 316 which orients the associated pipes 320 at approximately 135° with respect to each other. The upper wall 332 is downwardly sloping, with an opening 338 being provided in the upper wall and in the longer of the two side walls 330.

Assembly of the alternative embodiments, and the methods for using them, are the same as those procedures and steps which were described in connection with the preferred embodiment of FIGS. 1-4. It is apparent that the housing members may be subjected to additional alterations than those illustrated by way of example herein so as to adapt the housing members to any one of a number of possible fitting configurations.

Although the invention has been described herein in detail in connection with preferred and alternative embodiments, it is to be understood that numerous modifications and additions may be made to the invention by one skilled in the art without departing from the spirit and scope of the invention as defined in the appended claims.

What is claimed is:

1. A solder and heat flow control apparatus comprising a first housing member and a second housing member, each of said housing members define an interior cavity, a front opening provided in each of said housing members leading into its interior cavity, each of said front openings being circumscribed by walls which terminate in front surfaces, at least one of said walls of each housing member is provided along its front surface with a recess, said recesses being provided in said housing members in corresponding walls, each of said recesses being adapted to receive a part of a first conduit member which is adapted to be oriented longitudinally in said recess, a coolant inlet provided in one of said housing members communicating with its interior cavity, said first and second housing members being adapted to be assembled around said first conduit member by placing said conduit member longitudinally in the recess of a first one of said housing members, and aligning the recess of the other of said housing members with said recess of said first one of said housing members whereby the front surface of the walls in which said recesses are provided completely surround said conduit member and said interior cavities of said housing members are aligned, such that a portion of said conduit member is completely enclosed within said assembled housing members, and an unenclosed portion of said conduit member projects outside of said housing members through said aligned recesses, whereby introduction of a cooling medium into said assembled housing members through said coolant inlet maintains said enclosed portion of said conduit member at a temperature lower than the temperature of said unenclosed portion.

2. The solder and heat flow control apparatus recited in claim 1 wherein said recesses are semi-circular in cross-sectional configuration, and said conduit member has a circular cross-sectional configuration.

3. The solder and heat flow control apparatus recited in claim 1 further comprising means for aligning the recesses in said first housing member with the recesses in said second housing member.

4. The solder and heat flow control apparatus recited in claim 1 further comprising at least one second conduit member having an end inserted into an end of said unenclosed portion of said first conduit member, said end of said first conduit member having a portion overlapping said inserted end of said second conduit member, said overlapping portion having an exposed end, said enclosed portion of said first conduit member includes a part of said overlapping portion whereby, when said exposed end of said overlapping portion is heated and melted solder is applied thereto, said solder is caused to flow into said overlapping portion, the flow being terminated substantially at the point where said overlapping portion is enclosed by said housing members.

5. The solder and heat flow control apparatus recited in claim 4 wherein said cooling medium is liquid nitrogen.

6. A solder and heat flow control apparatus comprising a first housing member and a second housing member, each of said housing members being defined by a back wall, a pair of side walls, an upper wall and a lower wall, said side, upper and lower walls of each of said housing members having a front surface, said front surfaces of each of said housing members together defining a front opening which opens into the interior of the housing member, at least two of said side, upper or lower walls of said first housing member having its front surface interrupted by a first opening corresponding to a first half of the cross-sectional configuration of a first conduit member as viewed axially into said first openings, at least two of said side, upper or lower walls of said second housing member having its front surface interrupted by a second opening corresponding to the second half of the cross-sectional configuration of said first conduit member as viewed axially into said second openings, said first openings being provided in said first housing member on the same walls in which said second openings are provided in said second housing member, a coolant inlet provided in one of said housing members communicating with said interior of said housing members, at least one exhaust opening provided in one of said housing members establishing communication from said interior to the exterior of said housing member, first alignment means provided on said first housing member, second alignment means provided on said second housing member, said first alignment means being adapted to engage said second alignment means, said first and second housing members being adapted to be assembled around said conduit member by causing said first alignment means to engage said second alignment means, whereby said front surfaces of said first housing member are brought into abutting relationship with the corresponding front surfaces of said second housing member around said conduit member, such that said first openings are aligned with said second openings, whereby a portion of said conduit member is completely surrounded and enclosed by said assembled housing members, and unenclosed portions of said conduit member project outside of said housing members through said aligned first and second openings, said first and second housing members together defining an interior cavity within which a coolant is intended to be circulated, said coolant being directed into said cavity through said coolant inlet, said coolant circulating within said cavity being adapted to maintain said enclosed portion of said conduit member at a temperature lower than the temperature of said unenclosed portions.

7. The solder and heat flow control apparatus recited in claim 6 wherein said first and second openings are semi-circular, and said conduit member has a circular cross-sectional configuration.

8. The solder and heat flow control apparatus recited in claim 6 wherein said first alignment means comprises a pair of raised alignment members provided on one of said front surfaces of said first housing member and said second alignment means comprises a pair of apertures provided in the same one of said front surfaces of said second housing member, said first and second housing members being adapted to be assembled by inserting said alignment members into said apertures.

9. The solder and heat flow control apparatus recited in claim 6 wherein said coolant is liquid nitrogen.

10. The solder and heat flow control apparatus recited in claim 9 further comprising at least one second conduit member having an end inserted into an end of said first conduit member, said end of said first conduit member having a portion overlapping said inserted end of said second conduit member, said overlapping portion having an exposed end, said enclosed portion of said first conduit member includes a part of said overlapping portion whereby, when said exposed end of said overlapping portion is heated and melted solder is applied thereto, said solder is caused to flow into said overlapping portion, the flow being terminated substantially at the point where said overlapping portion is enclosed by said housing members.

11. The solder and heat flow control apparatus recited in claim 10 wherein heating of said overlapping portion causes said liquid nitrogen within said cavity to vaporize to form nitrogen gas, said nitrogen gas being vented from said cavity through said exhaust opening.

12. The solder and heat flow control apparatus recited in claim 6 wherein said first and second openings are provided in the upper walls and in each of the side walls of said housing members.

13. The solder and heat flow control apparatus recited in claim 6 wherein said first and second openings are provided in one of the side walls and in the upper walls of said housing members.

14. The solder and heat flow control apparatus recited in claim 6 wherein said first and second openings are provided in each of the side walls of said housing members.

15. The solder and that flow control apparatus recited in claim 6 wherein said first and second housing members are fabricated of steel.

16. The solder and heat flow control apparatus recited in claim 6 wherein said coolant inlet is provided in the lower wall of said first housing member.

17. The solder and heat flow control apparatus recited in claim 6 wherein said at least one exhaust opening is provided in the back wall of said second housing member.

18. The solder and heat flow control apparatus recited in claim 10 wherein said first conduit member is a copper pipe fitting and said second conduit member is a copper pipe.

19. A method of controlling heat flow in a metallic member comprising the steps of:
(a) placing a metallic member in an enclosed housing so that a first portion of said member is completely enclosed by said housing and a second portion of said member projects outside of said housing through an opening in said housing and is unenclosed;
(b) introducing a coolant into said housing;
(c) heating at least a part of said unenclosed portion whereby the flow of said heat in said metallic member is controlled, said enclosed portion of said metallic member being maintained at a temperature lower than the temperature of said unenclosed portion.

20. A method of controlling the flow of solder in metallic pipe members comprising the steps of:
(a) placing a first conduit member in an enclosed housing so that a portion of said first conduit member is completely enclosed by said housing and an end of said first conduit member projects outside of said housing through an opening in said housing and is unenclosed;
(b) inserting an end of a second conduit member into said unenclosed end of said first conduit member so that a portion of said first conduit member overlaps said inserted end, and said enclosed portion of said first conduit member includes a part of the overlapping portion;
(c) introducing liquid nitrogen into said housing;
(d) heating at least said unenclosed end of said first conduit member;
(e) applying molten solder to said heated end whereby said solder is caused to flow axially from said unenclosed end and across said overlapping portion in the space between said first conduit member and said second conduit member, the flow of said solder across said overlapping portion being terminated substantially at the point where said overlapping portion is enclosed by said housing.

21. The method recited in claim 20 further comprising the step of venting nitrogen gas from said housing.

* * * * *